US012533716B2

(12) United States Patent
Ou et al.

(10) Patent No.: US 12,533,716 B2
(45) Date of Patent: Jan. 27, 2026

(54) ULTRASONIC CLEANING MACHINE FOR RECYCLING AND CLEANING PLASTIC

(71) Applicant: ZHEJIANG BORETECH ENVIRONMENTAL ENGINEERING CO., LTD., Zhejiang (CN)

(72) Inventors: Zhewen Ou, Zhejiang (CN); Xin Yang, Zhejiang (CN)

(73) Assignee: ZHEJIANG BORETECH ENVIRONMENTAL ENGINEERING CO., LTD., Zhejiang (CN)

( * ) Notice: Subject to any disclaimer, the term of this patent is extended or adjusted under 35 U.S.C. 154(b) by 309 days.

(21) Appl. No.: 18/272,086

(22) PCT Filed: Nov. 15, 2022

(86) PCT No.: PCT/CN2022/131876
§ 371 (c)(1),
(2) Date: Jul. 12, 2023

(87) PCT Pub. No.: WO2023/041093
PCT Pub. Date: Mar. 23, 2023

(65) Prior Publication Data
US 2024/0066563 A1    Feb. 29, 2024

(30) Foreign Application Priority Data
Sep. 17, 2021    (CN) .......................... 202111095215.2

(51) Int. Cl.
*B08B 3/12*    (2006.01)
*B08B 13/00*    (2006.01)
(Continued)

(52) U.S. Cl.
CPC .............. *B08B 3/123* (2013.01); *B08B 13/00* (2013.01); *B29B 17/00* (2013.01);
(Continued)

(58) Field of Classification Search
CPC .......... B08B 3/123; B08B 3/12; B08B 13/00; B29B 17/02; B29B 17/00;
(Continued)

(56) References Cited

U.S. PATENT DOCUMENTS 5,894,996 A  *  4/1999  Williams ................ B03B 9/061
                                                209/172.5
11,220,026 B2 *  1/2022  Previero ................... B03B 5/40
(Continued)

FOREIGN PATENT DOCUMENTS

CA    2267914 A1 *  4/1998  ............. D06B 13/00
CA    2759268 A1 * 11/2010  .............. C08J 11/16
(Continued)

OTHER PUBLICATIONS

PCT International Search Report mailed Dec. 15, 2022 in counterpart PCT application PCT/CN2022/131876, 3 pages in English.

*Primary Examiner* — Benjamin L Osterhout
(74) *Attorney, Agent, or Firm* — Juan Carlos A. Marquez; Marquez IP Law Office, PLLC

(57) ABSTRACT

An ultrasonic cleaning machine for recycling and cleaning plastic, including a support assembly and a cleaning body, the cleaning body being mounted on the support assembly, the cleaning body being provided with a cleaning chamber for material cleaning, the cleaning body being provided with a plurality of ultrasonic vibrators for transmitting ultrasonic waves into the cleaning chamber, and the plurality of ultrasonic vibrators being distributed in the interlayer of the cleaning body. When cleaning a material, the material is evenly transported into the cleaning chamber through a feed apparatus. There is a liquid cleaning medium inside the cleaning chamber. When the material passes through the cleaning chamber filled with the cleaning medium, the
(Continued)

ultrasonic waves generated by the plurality of ultrasonic vibrators form a cavitation effect to clean the material.

20 Claims, 5 Drawing Sheets

(51) Int. Cl.
  *B29B 17/00* (2006.01)
  *B29B 17/02* (2006.01)
(52) U.S. Cl.
  CPC ....... *B29B 2017/0015* (2013.01); *B29B 17/02* (2013.01); *B29B 2017/0217* (2013.01); *B29B 2017/0286* (2013.01); *Y02W 30/62* (2015.05)
(58) Field of Classification Search
  CPC .... B29B 2017/0015; B29B 2017/0286; B29B 2017/0217; Y02W 30/62
  See application file for complete search history.

(56) References Cited

U.S. PATENT DOCUMENTS

| | | | | |
|---|---|---|---|---|
| 2002/0033550 | A1* | 3/2002 | Suehara | ........... B29B 17/02 264/921 |
| 2005/0003737 | A1* | 1/2005 | Montierth | ........ H01L 21/67057 451/5 |

FOREIGN PATENT DOCUMENTS

| | | | | |
|---|---|---|---|---|
| CN | 101157085 | A | 4/2008 | |
| CN | 201470639 | U | 5/2010 | |
| CN | 203556602 | U | 4/2014 | |
| CN | 203711404 | U | 7/2014 | |
| CN | 106166552 | A | 11/2016 | |
| CN | 212310264 | U | 1/2021 | |
| CN | 113857146 | A | 12/2021 | |
| DE | 10053177 | A1 * | 5/2001 | ............. B08B 3/12 |
| EP | 1188540 | A2 * | 3/2002 | ............... B09B 3/70 |
| KR | 102300563 | B1 * | 9/2021 | ............. B29B 17/02 |
| WO | WO-8800098 | A1 * | 1/1988 | ............. B03B 9/061 |

* cited by examiner

ULTRASONIC CLEANING MACHINE FOR RECYCLING AND CLEANING PLASTIC

CROSS-REFERENCE TO RELATED APPLICATION

This application is a national stage application filed under 35 U.S.C 371 of International Application No. PCT/CN2022/131876 filed Nov. 15, 2022, which claims priority to China Patent Application 202111095215.2 filed Sep. 17, 2021. The entire disclosures of the above applications are incorporated herein by reference in their entirety.

FIELD OF THE INVENTION

This invention relates to the technical field of plastic cleaning and recycling, and in particular, to an ultrasonic cleaning machine for recycling and cleaning plastic.

BACKGROUND OF THE INVENTION

As the consumption of plastic products continues to increase, waste plastics are also increasing. In addition, the annual consumption of plastics for automobiles in China has reached 400,000 tons, and the annual consumption of plastics for electronic appliances and home appliances has reached more than 1 million tons. These products have become one of the important sources of waste plastics after being scrapped.

It is learned that, domestic waste plastics in 2004 reached about 11 million tons. If raw materials of waste plastics waiting to be processed are not properly used and post-processed, the storage, transportation, and processing of these waste plastics will definitely damage the environment and endanger the health of people. Therefore, the recycling of waste plastics is an indispensable means to regain the use value of waste materials, turn waste into treasure, reduce environmental pollution, and promote sustainable economic and social development.

The plastic recycling system generally adopts a physical method, and includes equipment for processes of sorting, raw material pretreatment, cleaning, drying, granulation, and the like. A process of cleaning waste plastics is very important. The waste plastics must be cleaned sufficiently, so that the organic residues of cleaned materials are minimized, the quality is infinitely close to the raw materials, and there are wider fields for recycling to ensure the safety of subsequent plastic products.

In the prior art, such as the Chinese patent with the publication number CN204817265U, it discloses a plastic cleaning machine, including a cleaning machine body. The center of the cleaning machine body is provided with a cleaning shaft, and the lower end of the cleaning shaft is connected to a driven gear. The driven gear is meshed with a driving gear, the driving gear is connected to a driving motor, cleaning rods are arranged on two sides of the cleaning shaft, and cleaning columns are arranged on each cleaning rod. A first water inlet pipe is arranged on one side of the cleaning machine body, and a second water inlet pipe is arranged on the other side.

The existing technical solution has the following defects: The foregoing cleaning machine is provided with the driving gear, the driven gear, the cleaning columns, the first water inlet pipe, and the second water inlet pipe, so that when plastics are put into the washing machine, the driving gear rotates under the action of the driving motor, and the driving gear drives the driven gear to rotate, so as to implement the cleaning of the surface of the plastics by the cleaning columns. At present, in the recycling and cleaning industry of waste plastics, the cleaning principle of the foregoing cleaning machine is the same as that of the existing technology, and the cleaning of plastic chips is still in the stage of stirring and cleaning. After the verification of many experimental results, the cleaning effect of bottle chips did not reach the expected effect, which will increase the cost of cleaning the bottle chips.

SUMMARY OF THE INVENTION

In view of the deficiencies in the prior art, the objective of the present invention is to provide an ultrasonic cleaning machine. Through mounting a plurality of ultrasonic vibrators in the cleaning machine and using ultrasonic waves generated by the ultrasonic vibrators to rinse a material, the cleaning effect of the material is improved, and the cost of material cleaning is reduced.

The foregoing objective of the present invention is achieved by the following technical solution:

an ultrasonic cleaning machine, including a support assembly and a cleaning body, the cleaning body being mounted on the support assembly, the cleaning body being provided with a cleaning chamber for material cleaning, the cleaning body being provided with a plurality of ultrasonic vibrators for transmitting ultrasonic waves into the cleaning chamber, and the plurality of ultrasonic vibrators being distributed in the interlayer of the cleaning body.

In a preferred example, the present invention may be further configured as: one side of the cleaning body is provided with a feed pipe, and the other side is provided with a material discharge pipe; and a rough cleaning ultrasonic vibrator is in one side of the interlayer of the cleaning body close to the feed pipe, a fine cleaning ultrasonic vibrator is in one side of the interlayer of the cleaning body close to the material discharge pipe, and a resonant frequency of the fine cleaning ultrasonic vibrator is greater than a resonant frequency of the rough cleaning ultrasonic vibrator.

In a preferred example, the present invention may be further configured as: the cleaning chamber is provided with an liner, the liner is arranged coaxially with the cleaning body, and the outer wall of the liner and the inner wall of the cleaning body form the cleaning chamber.

In a preferred example, the present invention may be further configured as: the end of the liner close to the feed pipe is arranged in an inverted tapered shape.

In a preferred example, the present invention may be further configured as: a material evening mechanism is arranged between the feed pipe and the liner.

In a preferred example, the present invention may be further configured as: the material evening mechanism includes a driving apparatus, a material distribution box, a rotating shaft, and a discharge pipe, the material distribution box being mounted on the cleaning body and in communication with the feed pipe; and the driving apparatus is configured to drive the rotating shaft to rotate in the material distribution box, the discharge pipe is detachably fixed on the end of the rotating shaft away from the driving apparatus, two ends of the discharge pipe are in communication with the material distribution box and the cleaning chamber respectively, and a discharge port of the discharge pipe is arranged obliquely.

In a preferred example, the present invention may be further configured as: the material evening mechanism further includes a connecting ring and a plurality of connecting plates, the end of the connecting ring being fixedly connected to the discharge pipe, the connecting ring being coaxially fixedly connected to the rotating shaft through the plurality of connecting plates, and the plurality of connecting plates being evenly distributed on the outer side of the rotating shaft.

In a preferred example, the present invention may be further configured as: the bottom portion of the cleaning body is provided with a water inlet mechanism, the top portion of the cleaning body is provided with an overflow mechanism, and the water inlet mechanism and the overflow mechanism are respectively in communication with the cleaning chamber.

In a preferred example, the present invention may be further configured as: the overflow mechanism includes an overflow ring, an impurity overflow pipe, and a plurality of net plates, the overflow ring being fixed on the outer side of the cleaning body and forming an overflow groove with the outer wall of the cleaning body, the plurality of net plates being detachably fixed on the cleaning body, and the impurity overflow pipe being fixed on the overflow ring and in communication with the overflow groove.

In summary, the present invention includes at least one of the following beneficial technical effects:

1. When a material is being cleaned, the material is evenly transported into the cleaning chamber through a feed apparatus. There is a liquid cleaning medium inside the cleaning chamber. When the material passes through the cleaning chamber filled with the cleaning medium, the ultrasonic waves generated by the ultrasonic vibrators form a cavitation effect in the cleaning medium to clean the material. Compared with the traditional stirring cleaning method, the ultrasonic waves generated by the ultrasonic vibrators are used to rinse the material, which improves the cleaning effect of the material and reduces the cost of material cleaning.
2. The resonant frequency of the rough cleaning ultrasonic vibrator arranged on the upper portion of the cleaning body is 28 kHz. When the material is roughly cleaned, the ultrasonic waves generate large bubbles in the cleaning medium, which can remove the impurities on the surface of the material. The resonant frequency of the fine cleaning ultrasonic vibrator arranged on the lower portion of the cleaning body is 40 kHz. When the material is finely cleaned, the ultrasonic waves generate small and dense bubbles in the cleaning medium and act on the gap of the material, which can remove the impurities in the gap of the material. Rough cleaning first, followed by fine cleaning, the material is cleaner and the surface cleanliness of the material is better.
3. The material enters the material evening mechanism through the feed pipe, and is preliminarily divided under the action of the material evening mechanism. The evenly divided material slides down on the cone surface of the liner and a secondary division is performed. Under the action of gravity, the material evenly enters the ring-shaped cleaning chamber. The material is evenly distributed in the ring-shaped cleaning chamber. On the one hand, the cleaning effect of each piece of material can be improved. On the other hand, the use of ultrasonic vibrators can be maximized, so that the ultrasonic waves generated by each ultrasonic vibrator can clean the material in the cleaning medium, thereby improving the utilization of energy.

DETAILED DESCRIPTION

Figure 1:
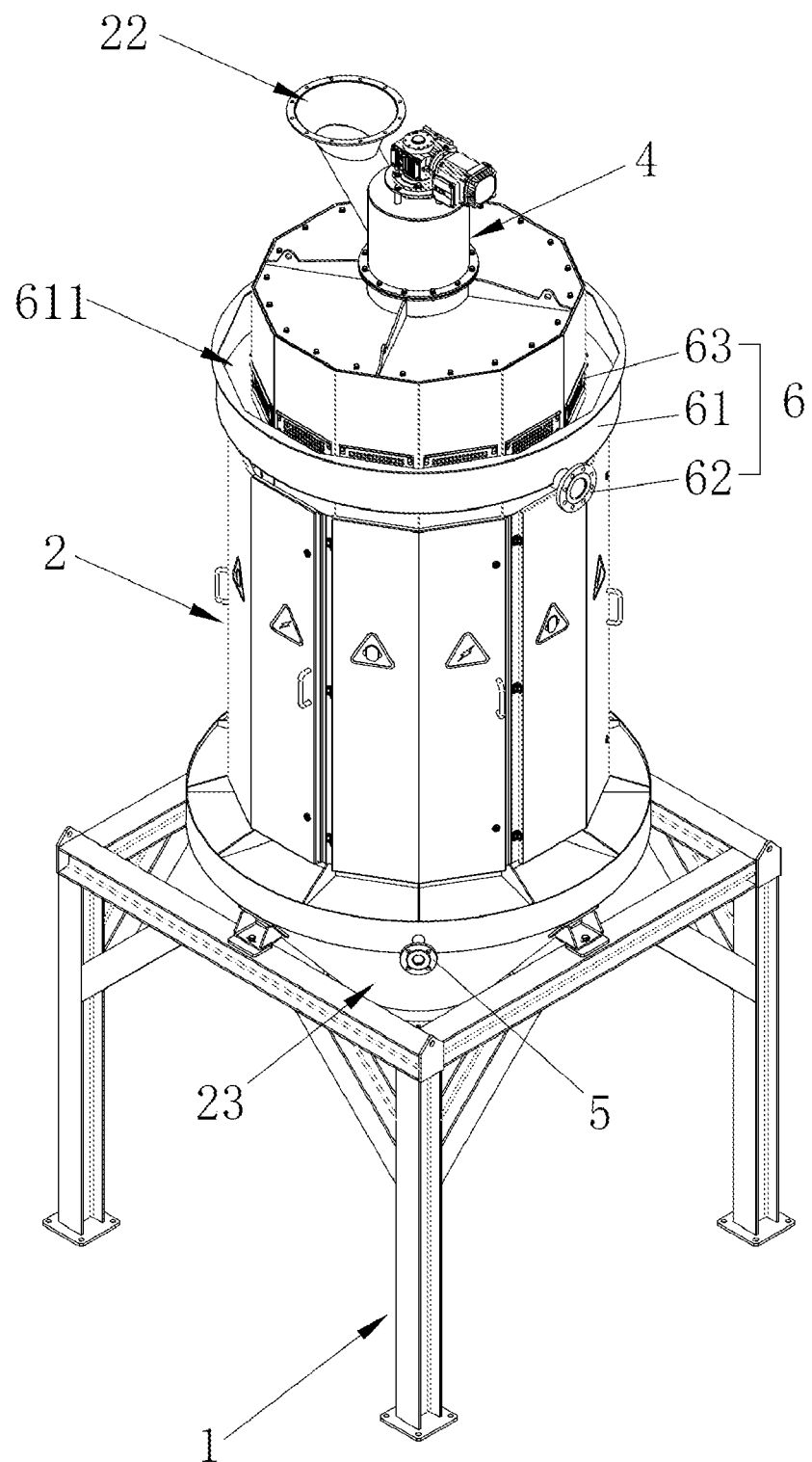
FIG. 1 is a schematic diagram of an integral structure according to the present invention.

A plurality of implementations or examples are provided below to implement different features of this disclosure. A specific example of an assembly and a configuration described below is used to simplify the disclosure. It is contemplated that such descriptions are merely examples, and are not intended to limit the disclosure. For example, in the following description, a first feature is formed on or above a second feature, and the description may include that, in some embodiments, the first feature and the second feature directly contact with each other; and the description may further include that, in some embodiments, an additional assembly is formed between the first feature and the second feature so that the first feature and the second feature may not be in direct contact. In addition, the disclosure may repeat assembly symbols and/or labels in various embodiments. The repetition is for the purpose of brevity and clarity, but does not indicate a relationship between the various embodiments and/or configurations discussed.

Further, space-related terms such as "under", "below", lower", "above", and "over" are used herein for the ease of the description of a relationship between an assembly or a feature relative to another or a plurality of assemblies or features shown in the figure. The space-related terms are intended to encompass different orientations of the device in use or operation in addition to the orientations depicted in the figures. The device may be disposed at other orientations (for example, rotating by 90 degrees or being located at other orientations), and the space-related terms should interpret accordingly.

Value range and parameters that are used to define a relatively wide scope of this application are all approximate values, but related values in specific embodiment are presented herein as accurately as possible. However, any numerical value inevitably includes a standard deviation caused by an individual test method. As described herein, the term "about" generally means that an actual value falls within plus or minus 10%, 5%, 1%, or 0.5% of a specific value or range. Alternatively, the term "about" means that the actual value falls within an acceptable standard error of an average value, depending on the consideration of a person of ordinary skill in the art of this application. It should be understood that, in addition to experimental examples, or unless otherwise clearly stated, all ranges, quantities, values, and percentages (for example, being used for describing material use amount, time length, temperature, operation condition, quantity ratio, and the like) used herein are all modified by "about". Therefore, unless otherwise stated, the numerical parameters disclosed in this specification and the appended claims are all approximate values, and may be changed as required. At least these numerical parameters should be considered as indicated valid bits and the value obtained by applying the general rounding method. As described herein, the value range is expressed to move from one end to an other end or locate between the two ends; unless otherwise stated, the value range described herein include endpoints.

The following further describes the present invention in detail with reference to the accompanying drawings.

Referring to FIG. 1, the present invention discloses an ultrasonic cleaning machine, including a support assembly 1 and a cleaning body 2, the cleaning body 2 being mounted on the support assembly 1, the cleaning body 2 being provided with a cleaning chamber 21 for material cleaning, the cleaning body 2 being provided with a plurality of ultrasonic vibrators 3 for transmitting ultrasonic waves into the cleaning chamber 21, and the plurality of ultrasonic vibrators 3 being distributed in the interlayer of the cleaning body 2.

Through the conversion of piezoelectric ceramics, the plurality of ultrasonic vibrators convert high-frequency electric energy into vibration mechanical energy, and transmit the vibration mechanical energy to the cleaning medium through the inner wall of the cleaning body 2, so that the cleaning medium continuously generates a large number of tiny bubbles with a diameter of 50 μm to 500 μm. The tiny bubbles in the medium vibrate under the action of the sound field. When the sound pressure reaches a certain value, the bubbles increase rapidly and then close suddenly. When the bubbles are closed, shock waves are generated, and thousands of atmospheric pressures are generated around the bubbles, which destroys the connection between the dirt and the plastic fragments, thereby cleaning the dirt and impurities on the plastic fragments.

One side of the cleaning body 2 is provided with a feed pipe 22, and the other side is provided with a material discharge pipe 23. A rough cleaning ultrasonic vibrator 31 is in one side of the interlayer of the cleaning body 2 close to the feed pipe 22, a fine cleaning ultrasonic vibrator 32 is in one side of the interlayer of the cleaning body 2 close to the material discharge pipe 23, and a resonant frequency of the fine cleaning ultrasonic vibrator 32 is greater than a resonant frequency of the rough cleaning ultrasonic vibrator 31.

Figure 3:
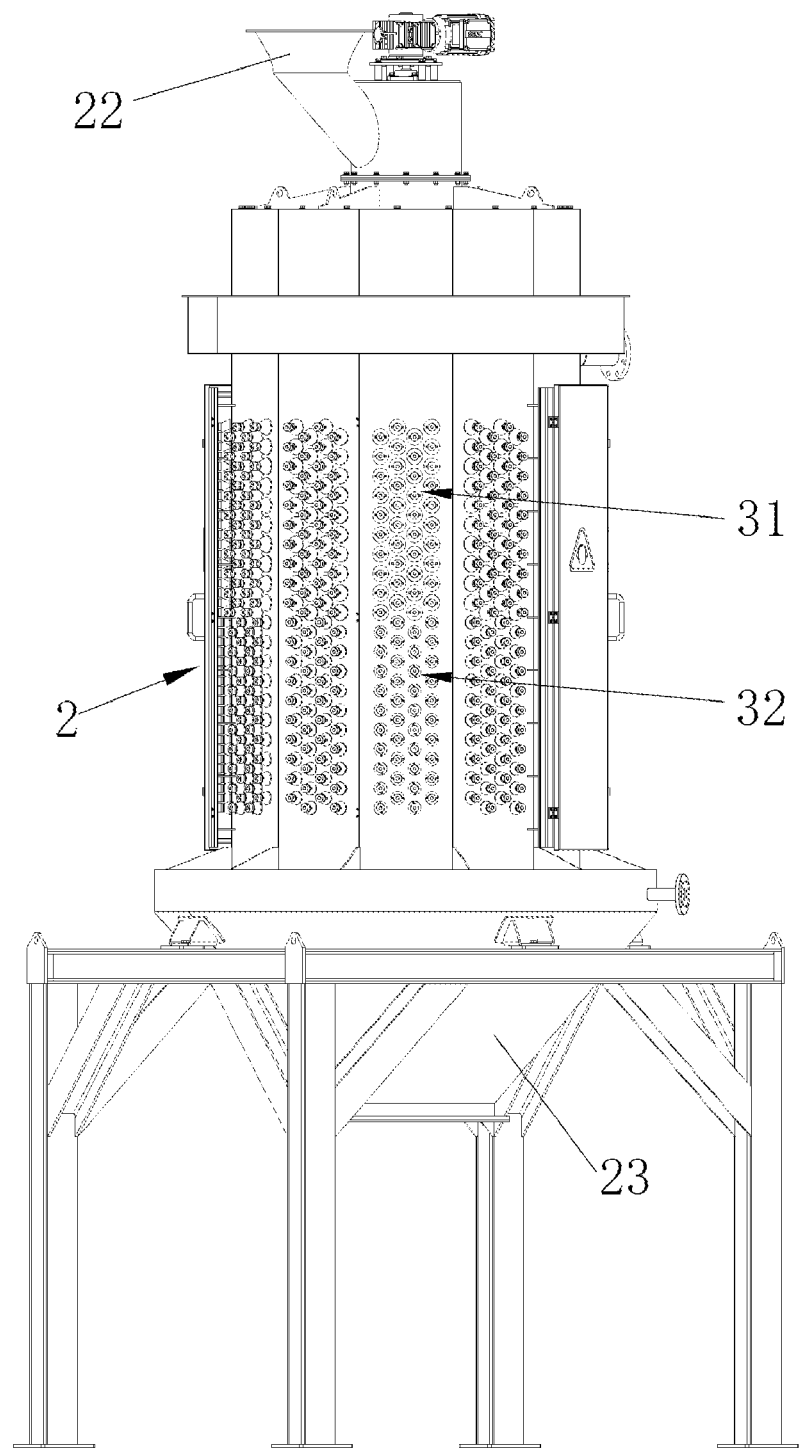
FIG. 3 is a schematic diagram of arrangement of ultrasonic vibrators according to the present invention.

In this embodiment, the model of the rough cleaning ultrasonic vibrator 31 is CW-4GL-3828, and the model of the fine cleaning ultrasonic vibrator 32 is CW-4GL-3840. There is a certain order for the vibrator arrangement of the ultrasonic vibrators 3. Referring to FIG. 3, the inner wall of the cleaning body is provided with twelve surfaces in total, 40 CW-4GL-3828 rough cleaning ultrasonic vibrators and 40 CW-4GL-3840 fine cleaning ultrasonic vibrators are arranged on each surface, and a total of 480 rough cleaning ultrasonic vibrators 31 and 480 fine cleaning ultrasonic vibrators 32 are arranged.

The resonant frequency of the rough cleaning ultrasonic vibrator arranged on the upper portion of the cleaning body 2 is 28 kHz. When the material is roughly cleaned, the ultrasonic waves generate large bubbles in the cleaning medium, which can remove the impurities on the surface of the material. The resonant frequency of the fine cleaning ultrasonic vibrator arranged on the lower portion of the cleaning body 2 is 40 kHz. When the material is finely cleaned, the ultrasonic waves generate small and dense bubbles in the cleaning medium and act on the gap of the material, which can remove the impurities in the gap of the material. Rough cleaning first, followed by fine cleaning, the material is cleaner and the surface cleanliness of the material is better.

The cleaning chamber 21 is provided with a liner 24, the liner 24 is arranged coaxially with the cleaning body 2, and the outer wall of the liner 24 and the inner wall of the cleaning body 2 form the cleaning chamber 21. In this embodiment, the outer side of the liner 24 is uniformly fixedly connected to a plurality of mounting plates 25, and the other ends of the mounting plates 25 are fixed on the inner wall of the cleaning chamber 21, so as to implement fixing the liner 24 in the cleaning body 2. A ring-shaped cleaning chamber 21 is formed between the outer wall of the liner 24 and the inner wall of the cleaning body 2, so that fewer material passes through the same plane per unit time. Compared with an ordinary cleaning machine without a liner, because of the reduction of a cleaning space, the accumulation of the material is avoided, so that each piece of material can be fully cleaned during cleaning. The coaxial arrangement of the liner 24 and the cleaning body 2 makes the space of the ring-shaped cleaning chamber 21 more uniform, thereby ensuring that the material can be evenly distributed in the ring-shaped cleaning chamber 21, and further improving the cleaning effect of the ultrasonic waves on the material.

One end of the liner 24 close to the feed pipe 22 is arranged in an inverted tapered shape, and a material evening mechanism 4 is arranged between the feed pipe 22 and the liner 24. The material enters the material evening mechanism 4 through the feed pipe 22, and is preliminarily divided under the action of the material evening mechanism 4. The evenly divided material slides down on the cone surface of the liner 24 and a secondary division is performed. Under the action of gravity, the material evenly enters the ring-shaped cleaning chamber 21. On the one hand, the conical liner 24 realizes the function of secondary division. On the other hand, compared with the liner 24 without the conical surface, it ensures that each piece of the material can fall into the cleaning chamber 21, which avoids the material to stay on the liner 24, and improves the recycling rate of the material.

The material is evenly distributed in the ring-shaped cleaning chamber 21. During the process of the material moving downwardly from the top of the cleaning chamber, the material is firstly roughly cleaned under the action of the rough cleaning ultrasonic vibrator 31, and then finely cleaned by the fine cleaning ultrasonic vibrator 32. During the cleaning process, the exposed surface area of the material increases which avoids the accumulation of material. On the one hand, the cleaning effect of each piece of the material can be improved. On the other hand, the use of the ultrasonic vibrators 3 can be maximized, so that the ultrasonic waves generated by each ultrasonic vibrator can clean the material in the cleaning medium, thereby improving the utilization of energy.

Figure 2:
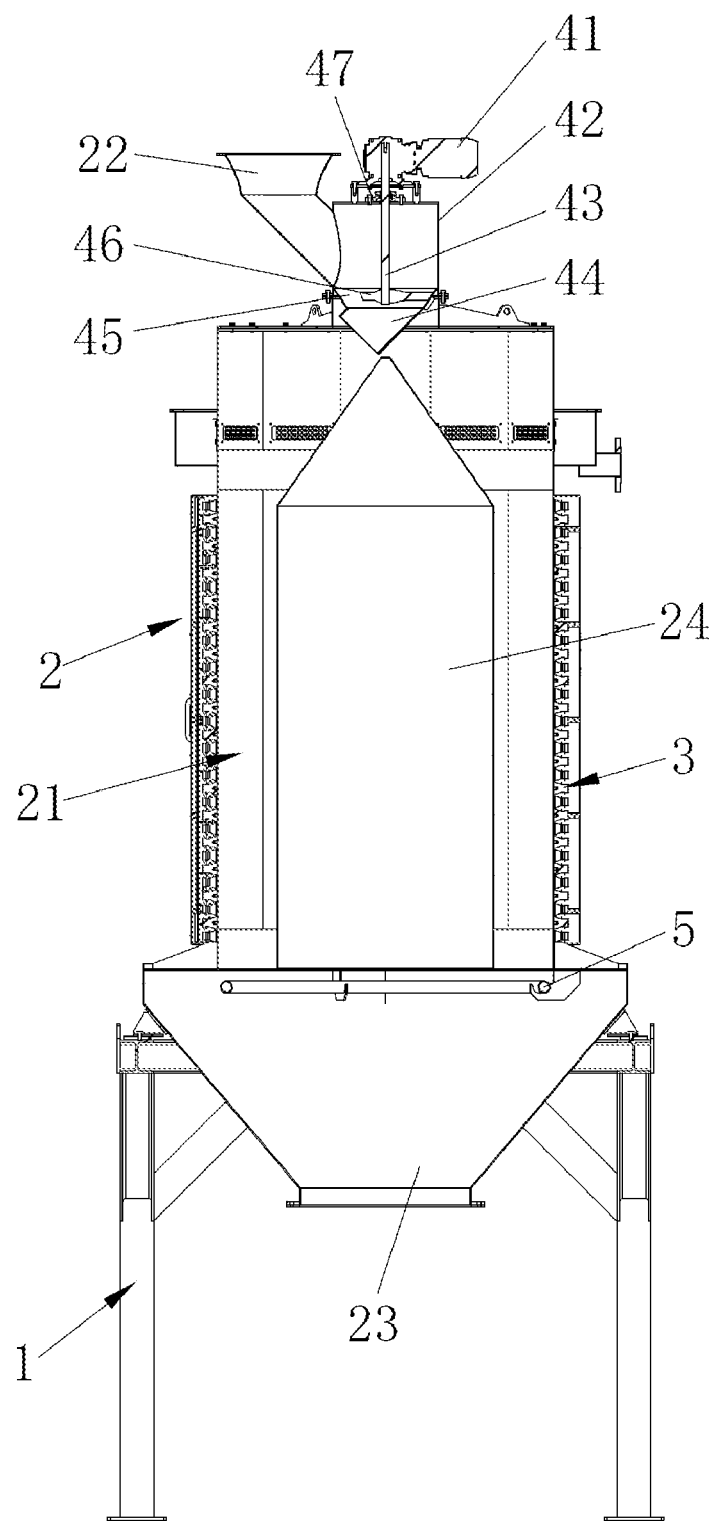
FIG. 2 is a cross-sectional view of a label removing and cleaning machine according to the present invention.
Figure 4:
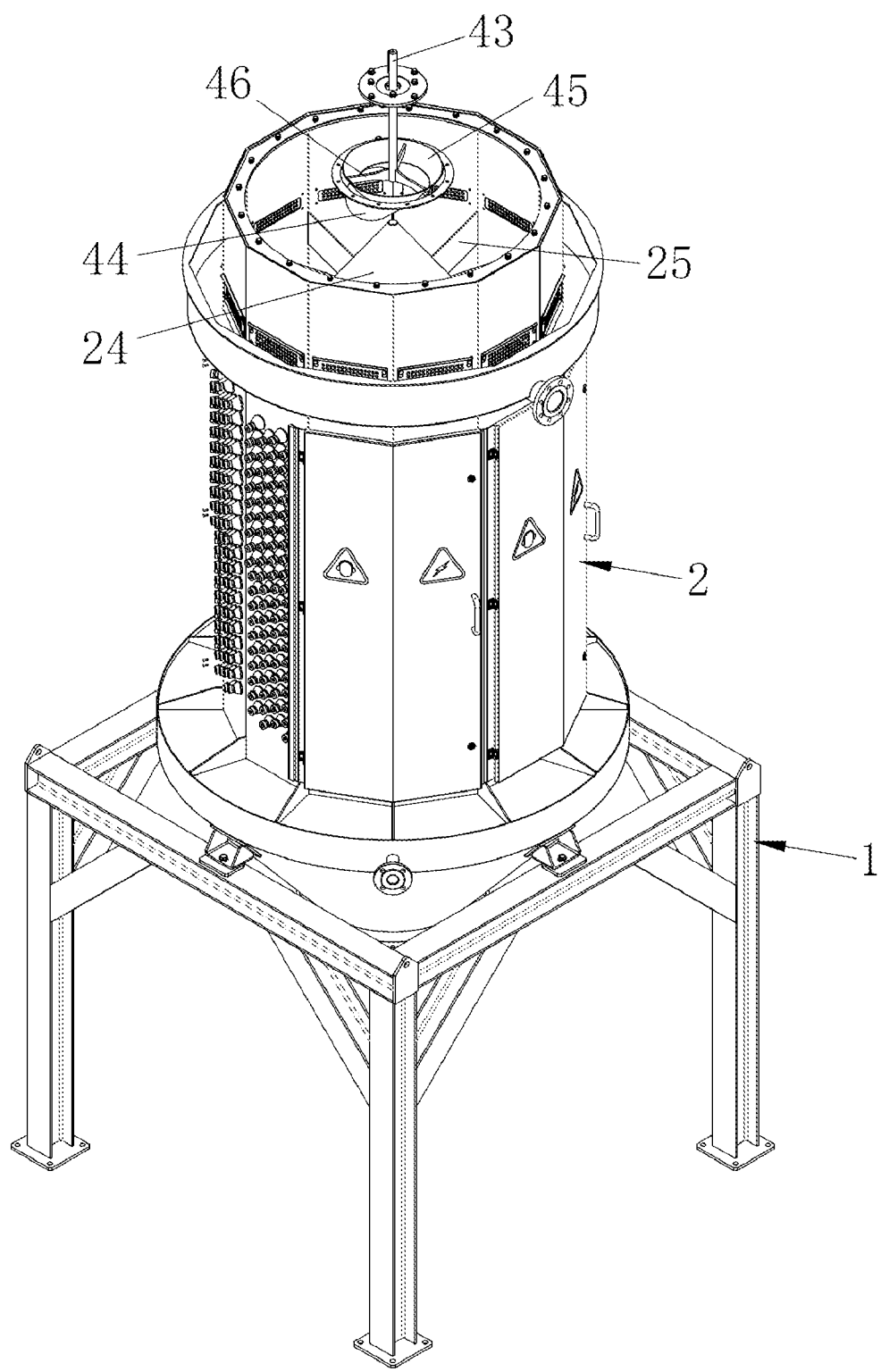
FIG. 4 is a schematic diagram of a structure omitting a driving apparatus and a feed pipe according to the present invention.

Referring to FIG. 2 and FIG. 4, the material evening mechanism 4 includes a driving apparatus 41, a material distribution box 42, a rotating shaft 43, and a discharge pipe 44, the material distribution box 42 being mounted on the cleaning body 2 and in communication with the feed pipe 22. The driving apparatus 41 is configured to drive the rotating shaft 43 to rotate in the material distribution box 42, the discharge pipe 44 is detachably fixed on the end of the rotating shaft 43 away from the driving apparatus 41, two ends of the discharge pipe 44 are in communication with the material distribution box 42 and the cleaning chamber 21 respectively, and a discharge port of the discharge pipe 44 is arranged obliquely.

When the material is added into the cleaning chamber 21, the material enters the material distribution box 42 from the feed pipe 22, and at the same time the driving apparatus 41 drives the rotating shaft 43 to rotate, and the rotating shaft 43 drives the oblique discharge pipe 44 to rotate. The discharge port of the discharge pipe 44 moves in a circle with the central axis of the liner 24 as the center. The material enters the discharge pipe 44 through the material distribution box 42. Under the action of the centrifugal force of the rotating discharge pipe 44, the material enters the ring-shaped cleaning chamber 21 evenly.

When the rotation speed of the rotating shaft 43 is fast, the material falls into the ring-shaped cleaning chamber 21 directly and evenly under the action of strong centrifugal force. When the rotation speed of the rotating shaft 43 is slow, the material falls slowly and is evenly distributed on the conical surface of the liner 24, and then falls into the ring-shaped cleaning chamber 21 with the action of gravity. The cooperation between the material evening mechanism 4 and the liner 24 with an inverted-tapered-shaped end can further ensure that the material evenly falls into the ring-shaped cleaning chamber 21, so that each piece of the material can be cleaned more fully, thereby improving the cleaning effect.

Figure 5:
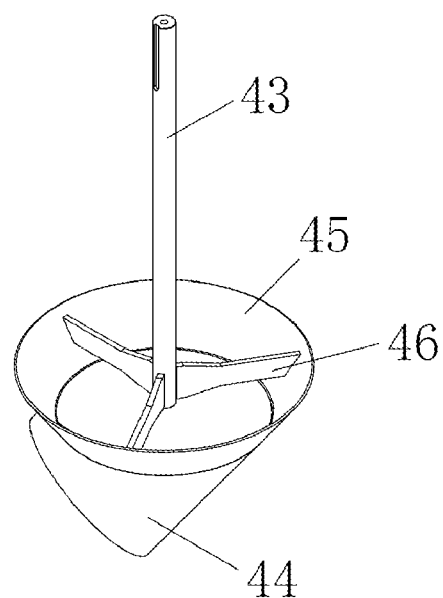
FIG. 5 is a schematic diagram of a structural of a material evening apparatus according to the present invention.

Referring to FIG. 5, the material evening mechanism 4 further includes a connecting ring 45 and a plurality of connecting plates 46, the end of the connecting ring 45 being fixedly connected to the discharge pipe 44, the connecting ring 45 being coaxially fixedly connected to the rotating shaft 43 through the plurality of connecting plates 46, and the plurality of connecting plates 46 being evenly distributed on the outer side of the rotating shaft 43.

The connecting ring 45 and the connecting plates 46 not only fix the discharge pipe 44 on the one end of a stirring shaft, so that the discharge pipe 44 can rotate together with the stirring shaft, but also the plurality of connecting plates 46 are evenly distributed on the outer side of the rotating shaft 43, one ends are fixedly connected to the rotating shaft 43, and the other ends are fixedly connected to the inner wall of the connecting ring 45. The plurality of connecting plates 46 divide the connecting ring 45 into feeding ports of the same size. When the rotating shaft 43 drives the connecting ring 45 to rotate, the material can evenly pass through each feeding port and fall into the discharge pipe 44 below, which realizes the effect of preliminary division and improves the uniformity of material dispersion in the discharge pipe 44.

In this embodiment, the driving apparatus 41 is configured as a gear motor. The setting of the gear motor allows the rotating shaft 43 adjusts the speed when rotating, so as to adapt to different quantities of materials. On the basis of ensuring that the material is evenly distributed in the ring-shaped cleaning chamber 21, the cleaning effect of the material and the service life of the gear motor can be improved. The rotating shaft 43 is rotationally arranged in the material distribution box 42 through a bearing 47, and one end of the rotating shaft 43 passes through the material distribution box 42 and the bearing 47 and then is in transmission connection with the gear motor.

The bottom portion of the cleaning body 2 is provided with a water inlet mechanism, and the top portion of the cleaning body 2 is provided with an overflow mechanism 6, and the water inlet mechanism and the overflow mechanism 6 are respectively in communication with the cleaning chamber 21. The cleaning medium is continuously injected into the cleaning chamber 21 through the water inlet mechanism at the bottom portion of the cleaning body 2, and the impurities gather on the surface of the cleaning medium under the action of buoyancy and newly injected cleaning medium. As the liquid level in the cleaning chamber 21 continues to rise, the impurities are removed through the overflow mechanism 6, thereby preventing the removed impurities from adhering to the material and entering the next process, and ensuring the cleaning effect of the material in the cleaning chamber 21.

In this embodiment, further, the water inlet mechanism is configured as a water inlet pipe 5, and one end of the water inlet pipe 5 is in communication with the cleaning chamber 21 The overflow mechanism 6 includes an overflow ring 61, an impurity overflow pipe 62, and a plurality of net plates 63, the overflow ring 61 being fixed on the outer side of the cleaning body 2 and forming an overflow groove 611 with the outer wall of the cleaning body 2, the plurality of net plates 63 being detachably fixed on the cleaning body 2, and the impurity overflow pipe 62 being fixed on the overflow ring 61 and in communication with the overflow groove 611.

The cleaning medium enters the cleaning chamber 21 from the water inlet pipe 5 at the bottom portion of the cleaning body 2. As the liquid level rises, the impurities float on the surface of the liquid level and enter the overflow groove 611 of the overflow ring 61 through the net plates 63 with some cleaning medium, and then are discharged through the impurity overflow pipe 62. A plurality of small through holes are evenly provided on the net plates 63. On the one hand, the impurities and the cleaning medium can overflow into the overflow groove 611 through the through holes. On the other hand, the through holes can prevent the material from running out, and ensure the recycling rate of the material.

The implementation principle of this embodiment is: When a material is being cleaned, the material is evenly transported into the cleaning chamber 21 through a feed apparatus. There is a liquid cleaning medium inside the cleaning chamber 21. When the material passes through the cleaning chamber 21 filled with the cleaning medium, the ultrasonic waves generated by the ultrasonic vibrators form a cavitation effect in the clean medium to clean the material. Compared with the traditional stirring cleaning method, the ultrasonic waves generated by the ultrasonic vibrators 3 are used to rinse the material, which improves the cleaning effect of the material and reduces the cost of material cleaning.

The foregoing summarizes features of several embodiments so that the technical personnel in the art may better understand aspects of the present invention. The technical personnel in the art should learn that they can readily use this application as a basis for designing or modifying other processes and structures for carrying out the same purposes and/or achieving the same advantages of the embodiments introduced herein. The technical personnel in the art should also realize that such equivalent constructions do not depart from the spirit and scope of the present disclosure, and that they may make various changes, substitutions and alterations herein without departing from the spirit and scope of the present disclosure.

In addition, the scope of this application is not limited to processes, machines, manufacturing, material compositions, components, methods, and steps in a specific embodiment in this specification. The technical personnel in the art will easily understand according to the disclosure content of the disclosure, and can utilize the existing or subsequently developed processes, machines, manufacturing, material compositions, components, methods or steps that perform substantially the same functions as the corresponding embodiments described herein or achieve substantially the same results according to the disclosure. Therefore, the appended claims intend to include such processes, machines, manufacturing, material compositions, components, methods, or steps within the scope thereof.

We claim:

1. An ultrasonic cleaning machine for recycling and cleaning plastic, comprising a support assembly and a cleaning body, the cleaning body being mounted on the support assembly, and the cleaning body being provided with a cleaning chamber for material cleaning, wherein the cleaning body is provided with a plurality of ultrasonic vibrators for transmitting ultrasonic waves into the cleaning chamber, the plurality of ultrasonic vibrators being distributed in an interlayer of the cleaning body.

2. The ultrasonic cleaning machine of claim 1, wherein a first side of the cleaning body is provided with a feed pipe, and the other a second side of the cleaning body is provided with a material discharge pipe; and a first cleaning ultrasonic vibrator is in the first side of the interlayer of the cleaning body close to the feed pipe, a second cleaning ultrasonic vibrator is in the second side of the interlayer of the cleaning body close to the material discharge pipe, and a resonant frequency of the second cleaning ultrasonic vibrator is greater than a resonant frequency of the first cleaning ultrasonic vibrator.

3. The ultrasonic cleaning machine of claim 2, wherein the first cleaning ultrasonic vibrator is arranged on an upper portion of the cleaning body, and the second cleaning ultrasonic vibrator is arranged on a lower portion of cleaning body.

4. The ultrasonic cleaning machine of claim 2, a resonant frequency of the first cleaning ultrasonic vibrator is 28 kHz.

5. The ultrasonic cleaning machine of claim 2, a resonant frequency of the second cleaning ultrasonic vibrator is 40 kHz.

6. The ultrasonic cleaning machine of claim 2, wherein the cleaning chamber is provided with a liner, the liner is arranged coaxially with the cleaning body, and an outer wall of the liner and an inner wall of the cleaning body form the cleaning chamber.

7. The ultrasonic cleaning machine of claim 6, wherein a first end of the liner close to the feed pipe is arranged in an inverted tapered shape, and the first end of the liner is closer to the feed pipe than other ends of the liner.

8. The ultrasonic cleaning machine of claim 6, wherein an outer side of the liner is uniformly fixedly connected to a plurality of mounting plates, and the other ends of the mounting plates are fixed on the inner wall of the cleaning chamber.

9. The ultrasonic cleaning machine of claim 6, wherein a material evening mechanism is arranged between the feed pipe and the liner.

10. The ultrasonic cleaning machine of claim 9, wherein the material evening mechanism comprises a driving apparatus, a material distribution box, a rotating shaft, and a discharge pipe, the material distribution box being mounted on the cleaning body and in communication with the feed pipe; and the driving apparatus is configured to drive the rotating shaft to rotate in the material distribution box, the discharge pipe is detachably fixed on one end of the rotating shaft away from the driving apparatus, two ends of the discharge pipe are in communication with the material distribution box and the cleaning chamber respectively, and a discharge port of the discharge pipe is arranged obliquely.

11. The ultrasonic cleaning machine of claim 10, wherein a discharge port of the discharge pipe moves in a circle with a central axis of the liner as the center.

12. The ultrasonic cleaning machine of claim 10, wherein the driving apparatus includes a gear motor allowing the rotating shaft to adjust adjusts speed when rotating.

13. The ultrasonic cleaning machine of claim 10, wherein the material evening mechanism further comprises a connecting ring and a plurality of connecting plates, one end of the connecting ring being fixedly connected to the discharge pipe, the connecting ring being coaxially fixedly connected with the rotating shaft through the plurality of connecting plates, and the plurality of connecting plates being evenly distributed on an outer side of the rotating shaft.

14. The ultrasonic cleaning machine of claim 13, wherein the plurality of connecting plates divide the connecting ring into feeding ports of the same size.

15. The ultrasonic cleaning machine of claim 1, wherein a bottom portion of the cleaning body is provided with a water inlet mechanism, a top portion of the cleaning body is provided with an overflow mechanism, and the water inlet mechanism and the overflow mechanism are respectively in communication with the cleaning chamber.

16. The ultrasonic cleaning machine of claim 15, wherein a cleaning medium is injected into the cleaning chamber through the water inlet mechanism and discharged from the cleaning chamber through the overflow mechanism.

17. The ultrasonic cleaning machine of claim 15, wherein the water inlet mechanism comprises a water inlet pipe, one end of the water inlet pipe is in communication with the cleaning chamber.

18. The ultrasonic cleaning machine of claim 15, wherein the overflow mechanism comprises an overflow ring, an impurity overflow pipe, and a plurality of net plates, the overflow ring being fixed on an outer side of the cleaning body and forming an overflow groove with the outer wall of the cleaning body, the plurality of net plates being detachably fixed on the cleaning body, and the impurity overflow pipe being fixed on the overflow ring and in communication with the overflow groove.

19. The ultrasonic cleaning machine of claim 18, wherein a plurality of through holes are evenly provided on the net plates.

20. The ultrasonic cleaning machine of claim 1, wherein the cleaning chamber comprises a ring-shaped structure formed between an outer wall of the liner and an inner wall of the cleaning body.

* * * * *